United States Patent
Mardjono et al.

(10) Patent No.: US 10,408,165 B2
(45) Date of Patent: Sep. 10, 2019

(54) DEVICE WITH GRATINGS FOR EJECTING MICROJETS IN ORDER TO REDUCE THE JET NOISE OF A TURBINE ENGINE

(71) Applicant: SAFRAN AIRCRAFT ENGINES, Paris (FR)

(72) Inventors: Jacky Mardjono, Moissy-cramayel (FR); Philippe Chanez, Moissy-cramayel (FR); Jeremy Gonzalez, Moissy-cramayel (FR); Maxime Koenig, Moissy-cramayel (FR); Marc Versaevel, Le Havre (FR); Franck Zaganelli, Fontainebleu (FR); Henri Yesilcimen, Moissy-cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 15/561,359

(22) PCT Filed: Mar. 25, 2016

(86) PCT No.: PCT/FR2016/050690
§ 371 (c)(1),
(2) Date: Sep. 25, 2017

(87) PCT Pub. No.: WO2016/151267
PCT Pub. Date: Sep. 29, 2016

(65) Prior Publication Data
US 2018/0080408 A1    Mar. 22, 2018

(30) Foreign Application Priority Data

Mar. 26, 2015  (FR) ........................................ 15 52535
Mar. 26, 2015  (FR) ........................................ 15 52536

(51) Int. Cl.
*F02K 1/34*     (2006.01)
*F02K 3/06*     (2006.01)

(52) U.S. Cl.
CPC .................. *F02K 1/34* (2013.01); *F02K 3/06* (2013.01); *F05D 2220/323* (2013.01);
(Continued)

(58) Field of Classification Search
CPC ........ F02K 1/34; F02K 3/06; F05D 2270/306; F05D 2260/96; F05D 2220/323
See application file for complete search history.

(56) References Cited

U.S. PATENT DOCUMENTS 8,020,368 B2 *  9/2011  Bonnet ..................... F02K 1/34
                                                    181/221
8,393,139 B2 *  3/2013  Huber ....................... F02K 1/34
                                                     60/231

(Continued)

FOREIGN PATENT DOCUMENTS

EP    2 157 305 A2    2/2010
FR    3 009 027 A1    1/2015
JP    2011-99420 A    5/2011

OTHER PUBLICATIONS

International Search Report dated Jun. 16, 2016 in PCT/FR2016/050690 filed Mar. 25, 2016.

*Primary Examiner* — Sizo B Vilakazi
(74) *Attorney, Agent, or Firm* — Oblon, McClelland, Maier & Neustadt, L.L.P.

(57) ABSTRACT

A device for reducing the jet noise of a turbine engine includes an outer cover having an inside wall defining the outside of an annular passage for passing a bypass stream from the engine, the wall of the outer cover including a plurality of microjet circuits, each including intakes for taking a gas stream from the bypass stream flow passage and leading to a single feed duct, which in turn opens out into the (Continued)

trailing edge of the outer cover via at least one ejection grating suitable for splitting the intake gas stream into a plurality of gas streams of right sections of dimensions less than a right section of the feed duct.

21 Claims, 4 Drawing Sheets

(52) U.S. Cl.
 CPC .... *F05D 2260/96* (2013.01); *F05D 2270/306* (2013.01); *Y02T 50/671* (2013.01)

(56) References Cited

U.S. PATENT DOCUMENTS

| | | | |
|---|---|---|---|
| 9,885,315 B2 * | 2/2018 | Vuillemin | F02K 1/34 |
| 2003/0182925 A1 | 10/2003 | Lair | |
| 2010/0043393 A1 | 2/2010 | Zamora et al. | |
| 2011/0000181 A1 * | 1/2011 | Oishi | B64C 7/02 |
| | | | 60/39.5 |
| 2012/0240587 A1 * | 9/2012 | Tanaka | F02C 6/08 |
| | | | 60/770 |
| 2015/0219013 A1 | 8/2015 | Huber et al. | |

* cited by examiner

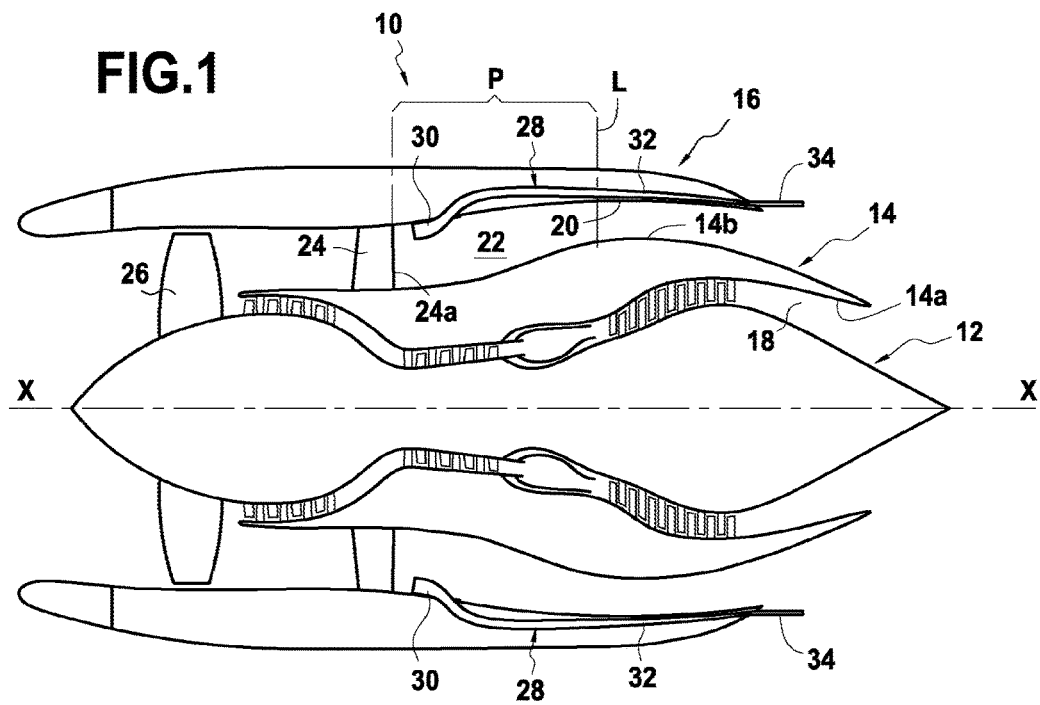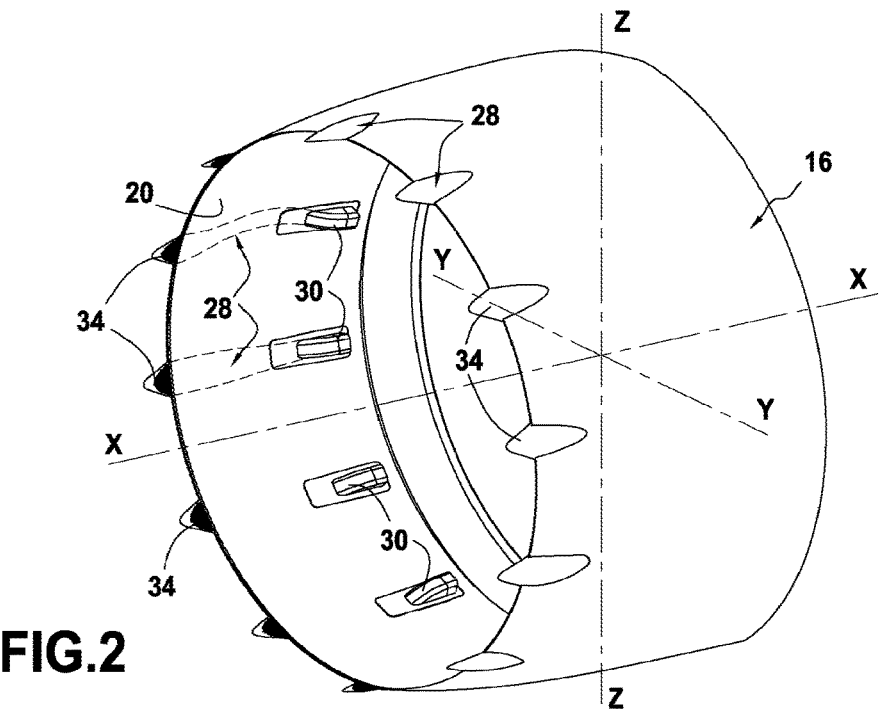

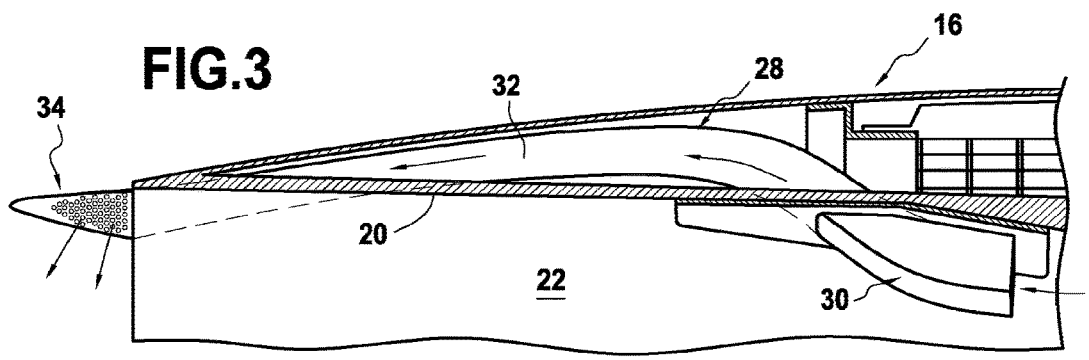
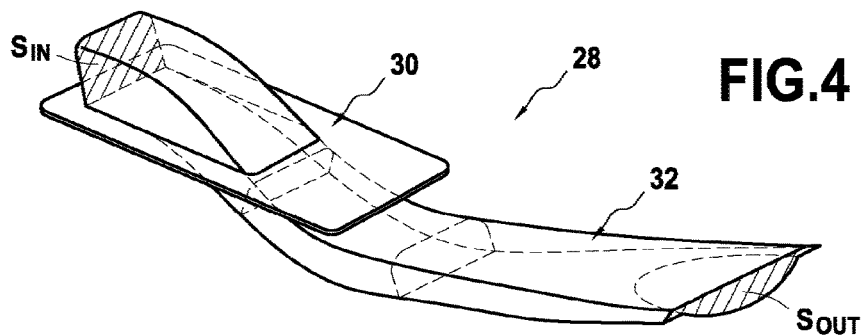
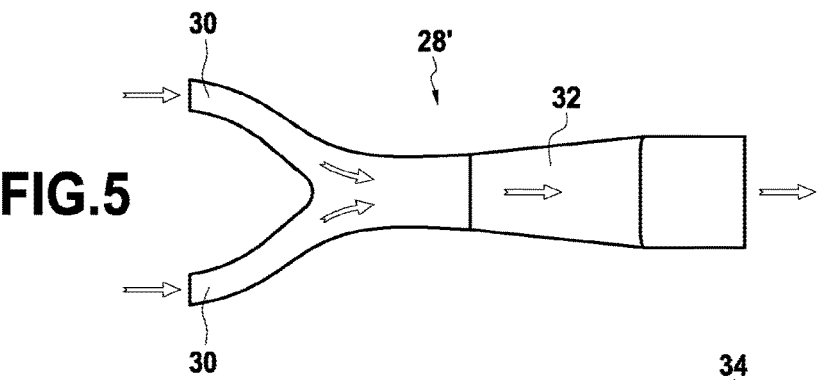
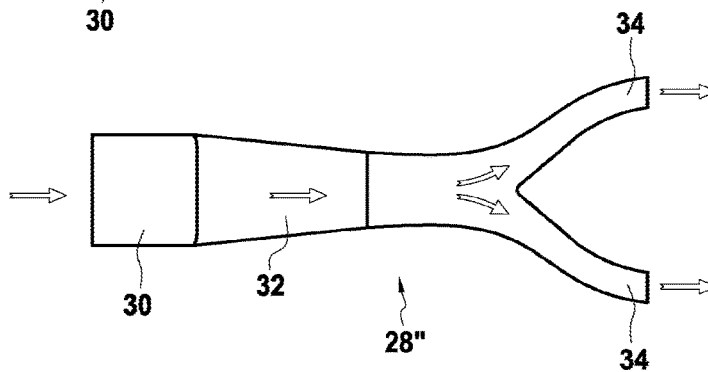

FIG.8
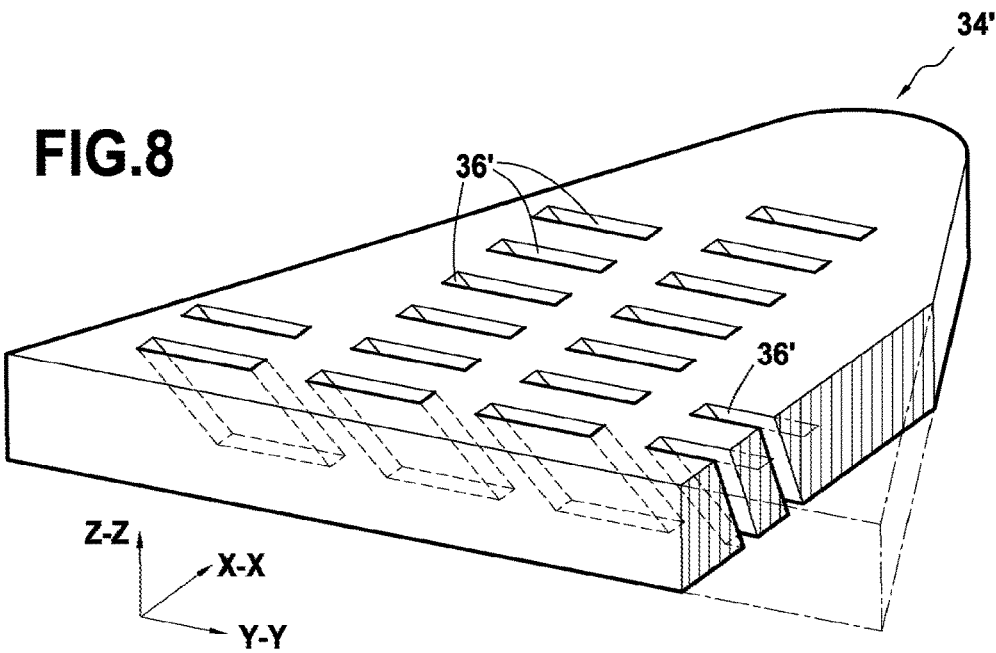
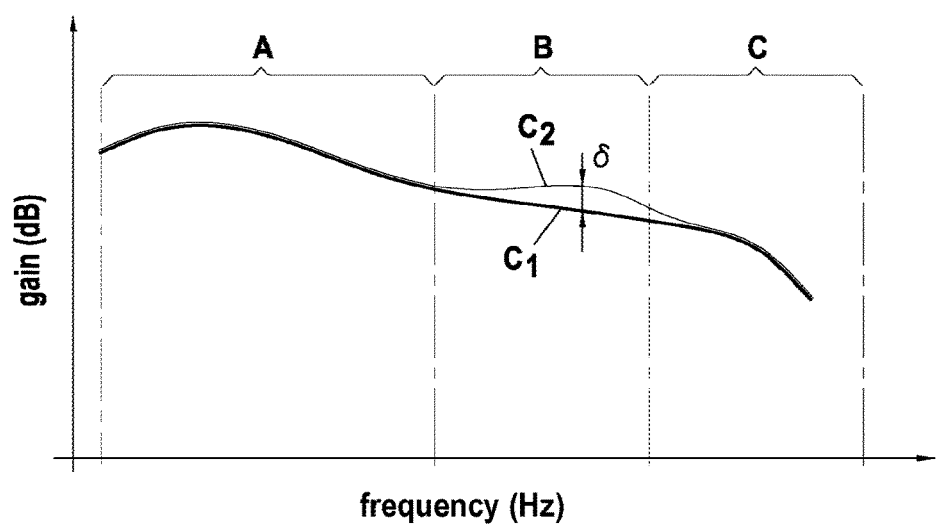
FIG.9

DEVICE WITH GRATINGS FOR EJECTING MICROJETS IN ORDER TO REDUCE THE JET NOISE OF A TURBINE ENGINE

BACKGROUND OF THE INVENTION

The present invention relates to the general field of reducing jet noise from a turbine engine having a nozzle of the type with separate streams.

Sound pollution has nowadays become a subject of concern for engine manufacturers, who are being confronted more and more about the sound nuisance of their engines. There are numerous sources of noise in a turbine engine, but it has been found that the jet noise at the outlet from the nozzle of an engine is the noise that predominates during airplane takeoff stages. Since certification authorities are becoming more and more demanding concerning sound emissions from turbine engines, engine manufacturers are being required to make efforts to reduce the noise from their engines, and in particular jet noise.

Typically, an engine having a nozzle with separate streams comprises a central body centered on the longitudinal axis of the engine, an inner cover arranged coaxially around the central body so as to co-operate therewith to define an annular channel (or passage) for passing a core stream (or hot stream) from the engine and an outer cover arranged axially around the inner cover to co-operate therewith to define an annular channel for passing a bypass stream (or cold stream) coming from the engine.

In such an engine, the jet noise comes in particular from the mixing between the bypass stream and the air stream outside the engine flowing along the outside wall of the outer cover. That noise has a broad frequency band generated by two types of sound source: high frequency noise coming from small turbulent structures in the mixing between the streams and perceived essentially close to the point of ejection, and low frequency noise coming from large turbulent structures that appear far away from the jet.

In order to reduce jet noise, one of the means used consists in specifically increasing the mixing between the gas streams. For this purpose, it is known to take air flowing in the flow channel for the bypass stream and to eject it further downstream at the trailing edge of the outer cover so as to act on the shear layers that form in the zone where mixing takes place between the bypass stream and the air stream outside the engine. By way of example, reference may be made to Document WO 2006/013243, which describes an implementation of this principle in which air jets taken by feed ducts and ejected at the trailing edge of the outer cover converge in pairs in order to form interaction triangles.

In order to feed the air jets that form disturbances in line with the trailing edge of the outer cover, that solution requires air to be taken from the flow in the flow channel for the bypass stream, which presents the advantage of avoiding having recourse to an additional air supply system. Nevertheless, taking air in that way from the bypass stream necessarily gives rise to impacts on the performance of the engine, which impacts may turn out to be critical if they are not optimized sufficiently.

The solutions proposed in the prior art thus do not always make it possible to obtain a significant reduction in jet noise. Specifically, the presence of feed ducts together with their inlets and outlets gives rise to impacts on the performance of the engine that may turn out to be critical if they are not optimized sufficiently. Likewise, those ducts lead to significant noise penalties at medium and high frequencies, in particular as a result of the aerodynamic noise caused by the flow of the stream at the trailing edge of the outer cover.

OBJECT AND SUMMARY OF THE INVENTION

A main object of the present invention is thus to mitigate such drawbacks by proposing to reduce the jet noise of a turbine engine having a nozzle with separate streams, in particular by improving the acoustic performance at medium and high frequencies without excessively penalizing the performance of the engine.

This object is achieved by a device for reducing the jet noise from a turbine engine, comprising an outer cover provided on the inside with a wall forming an outer wall of an annular passage for passing a flow of a bypass stream coming from the engine, and wherein, in accordance with the invention, said wall of the outer cover, i.e. the outside wall of the annular passage, includes a plurality of microjet circuits, each having intake means for taking a stream of gas from the bypass stream flow passage and leading to a single feed duct, said feed duct opening out at a trailing edge of the outer cover via at least one ejection grating suitable for splitting the intake gas stream into a plurality of gas streams of right sections that are of dimensions smaller than a right section of the feed duct.

Each microjet circuit of the device of the invention serves to take air from the bypass stream flow channel and inject it at the trailing edge of the outer cover in order to act on the shear layers between the bypass stream and the air outside the engine flowing along the outer cover, thereby enhancing mixing between these streams of air. The device of the invention is remarkable in particular in that it proposes using an ejection grating for splitting the intake gas stream into a plurality of gas streams of small dimensions. The presence of such an ejection grating thus makes it possible to maintain the aerodynamic performance of the outer cover while giving rise to improved acoustic performance, in particular at medium and high frequencies. Specifically, the presence of the ejection grating makes it possible to avoid generating parasitic noise, since the plurality of gas streams of small dimensions present shapes that intrude little into the stream mixing. Furthermore, the ejection grating makes it possible to inject into the bypass stream with a penetration angle and/or a sideslip angle that favor reducing the jet noise. Finally, the noise generated by the ejection grating is small (relative to a single outlet tube), thereby improving the acoustic performance at medium and high frequencies.

Preferably, the ejection grating of each microjet circuit comprises a plate having a plurality of holes each having a right section of dimension less than the right section of the feed duct.

Under such circumstances, at least some of the holes in the plate of each ejection grating advantageously present, in a longitudinal plane relative to a flow axis of the bypass stream, a penetration angle relative to a radial axis of the outer cover lying in the range 10° to 60°, and/or, in a transverse plane relative to the flow axis of the bypass stream, a sideslip angle relative to said radial axis lying in the range 25° to 90°. The inventors have observed that penetration and sideslip angle selected in these ranges of values make it possible to obtain large improvements in terms of jet noise reduction.

The holes in the plate of each ejection grating may present a right section that is circular in shape. Under such circumstances, the right section of the holes in the plate of each ejection grating preferably presents a diameter lying in the range 0.5 millimeters (mm) to 2.5 mm.

Alternatively, the holes in the plate of each ejection grating may present a right section that is of rectangular or elliptical shape.

Also preferably, the ejection grating of each microjet circuit is in axial alignment with the gas stream intake means. This characteristic makes it possible to minimize head losses.

Also preferably, the ejection area of the ejection grating lies in the range 0.5% to 2.5% of the ejection area of the bypass stream flow passage.

The gas stream means in each microjet circuit may comprise one or two intake scoops opening out into the bypass stream flow passage and leading to the feed duct.

Advantageously, the device may further comprise outlet guide vanes extending radially from the inside wall of the outer cover through the bypass stream flow channel, each microjet circuit having at least one intake scoop opening out into the bypass stream flow passage downstream from the outlet guide vanes and leading to the feed duct.

Each microjet circuit of the device of the invention serves to take air from the bypass stream flow passage in order to inject it at the trailing edge of the outer cover so as to act on the shear layers between the bypass stream and the air outside the engine flowing along the outer cover, thereby enhancing mixing between those air streams. In this embodiment of the invention, the device is remarkable in particular in that in order to feed the microjet circuits, it proposes positioning the intake scoop directly downstream from the outlet guide vanes, i.e. in a zone where the conditions for feeding the circuits with air are the most favorable (the pressure is highest immediately downstream from the outlet guide vanes). By positioning the intake scoops in this way, it becomes possible to minimize the inlet section of the scoops—and thus to minimize the losses of engine performance—without thereby affecting the effectiveness of the device.

Preferably, at least one intake scoop of each microjet circuit opens out into the bypass stream flow channel in a zone of the outer cover that extends axially from upstream to downstream from the trailing edges of the outlet guide vanes to a limit lying in the range ⅓ to ⅔ of the axial distance between the trailing edges of the outlet guide vanes and the trailing edge of the outer cover.

Each microjet circuit may have a single intake scoop leading to the feed duct, the intake scoop and the downstream end of the feed duct being axially in alignment with each other.

Alternatively, each microjet circuit may have two intake scoops leading to the feed duct, the downstream end of the feed duct having its axis offset relative to each of the intake scoops.

In another alternative, each microjet circuit has a single intake scoop leading to the feed duct, which opens out at the trailing edge of the outer cover via two ejection gratings having their axes offset relative to the intake scoop.

The microjet circuits are preferably regularly spaced apart from one another around a longitudinal axis of the outer cover.

Advantageously, the device further includes means for deploying and retracting the intake scoops of the microjet circuits. It is thus possible to open the intake scoops during takeoff stages during which the microjets need to be activated in order to reduce jet noise, and to close the scoops during other stages of flight so as to avoid penalizing the performance of the engine.

Likewise, the device may comprise means for regulating the flow rate of the gas stream flowing in the feed ducts of the microjet circuits.

The variations in section between the inlet and outlet sections of each microjet circuit may advantageously be progressive in order to minimize head losses.

By way of example, the relationship governing said progressive variation in section may present a derivative at all points having an absolute value that is less than 0.1.

If consideration is given by way of example to a microjet circuit having an inlet section Si having a value of 0.003133 square meters ($m^2$), an outer section So having a value of 0.002038 $m^2$, and a curvilinear duct length having a value of 0.3 meters (m), then the relationship for progressive variation complies with the following equation $$\Delta S = So - Si > \frac{\Delta S}{L}$$

which can thus be written as follows:

$$\Delta S > -0.4\%$$

given that:

$$\frac{\Delta S}{L} = -0.365\%$$

Preferably, the number of microjet circuits of the device is greater than a value corresponding to six times the diameter expressed in meters of the circular section of the secondary nozzle at its ejection. This value is optimized so as to introduce a sufficient number of microjets to have an effect on the jet noise, but not too many in order to avoid taking too much air from the bypass stream, and thus in order to conserve good performance.

Preferably, the maximum number of microjets $N_{max}$ is less than a value equal to fifty times the diameter D of the nozzle in the secondary ejection plane, i.e.

$$N_{max} < 50 \times D$$

The microjets have a notable effect on the mean speed components of the flow so long as the ratio between the distance $\underline{x}$ downstream from the nozzle from the ejection over the diameter D of the nozzle in the secondary ejection plane is less than 4, i.e.:

$$x/D < 4$$

Each microjet has localized action of an extent that is associated with its geometrical characteristics, and in particular the injection angle, and on the thermodynamic conditions of injection. In order to act in satisfactory manner on the overall modes of the jet, it is preferable to comply with a minimum distribution of microjets distributed in azimuth at the nozzle.

In contrast, the number of microjets must not be too great in order to avoid the microjets colliding directly with one another, which would penalize the ability to control the overall modes of the jet, and in order to limit the impact on the performance of the engine.

The invention also provides a turbine engine comprising a central body, an inner cover arranged coaxially around the central body in order to co-operate therewith so as to define an annular channel for passing a core stream coming from the engine, and an outer cover arranged coaxially around the inner cover to co-operate therewith to define an annular channel for passing a bypass stream coming from the engine, the engine further including a jet noise reduction device as defined above, the outer cover of the engine advantageously being formed by the outer cover of said jet noise reduction device.

BRIEF DESCRIPTION OF THE DRAWINGS

Other characteristics and advantages of the present invention appear from the following description given with reference to the accompanying drawings, which show embodiments having no limiting character. In the figures:

FIG. 1 is a diagrammatic longitudinal section view of a bypass turbine engine fitted with a jet noise reduction device of the invention;

FIG. 2 is an enlarged perspective view of the FIG. 1 jet noise reduction device;

FIG. 3 is a longitudinal section view of the FIG. 2 device;

FIG. 4 is a perspective view of a microjet circuit of the FIG. 3 jet noise reduction device;

FIG. 5 is a view of a variant embodiment of a microjet circuit;

FIG. 6 is a view of a microjet circuit in another variant embodiment of the device of the invention;

FIG. 8 is a perspective view of an ejection grating in a variant embodiment; and FIG. 9 is a curve plotting improvements as gain in decibels) as a function of frequency (in Hz) showing the reduction of penalties at medium and high frequencies in the device of the invention.

DETAILED DESCRIPTION OF THE INVENTION

Figure 7A:
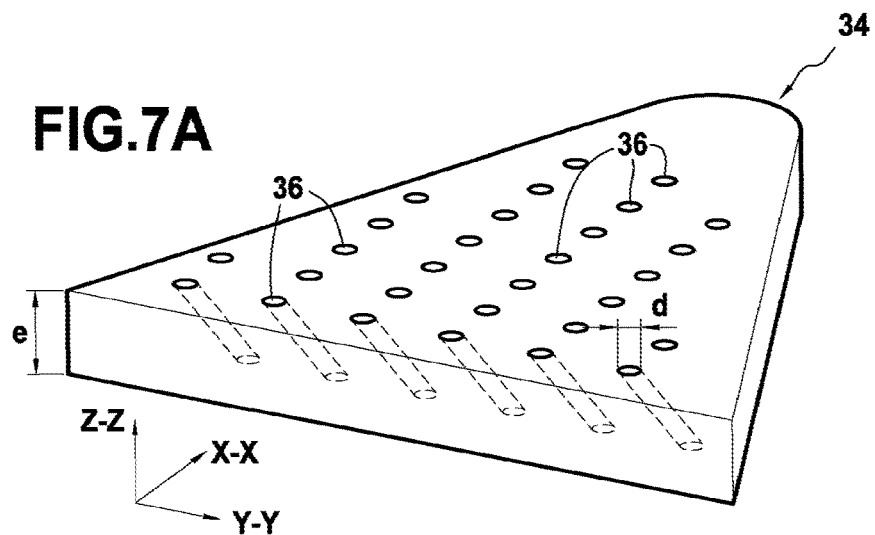
FIGS. 7A to 7C are views of an ejection grating on three different section planes.

FIG. 1 is a highly diagrammatic longitudinal section view of a turbine engine 10 having a nozzle of the type having separate streams.

In known manner, the engine 10 comprises a central body 12 centered on the longitudinal axis X-X of the engine, an inner cover 14 arranged coaxially around the central body, and an outer cover 16 arranged coaxially around the inner cover.

An inside wall 14a of the inner cover 14 co-operates with the central body 12 to define an annular channel (or passage) 18 for passing a core stream (or hot stream) coming from the engine. Likewise, an outside wall 14b of the inner cover 14 co-operates with an inside wall 20 of the outer cover 16 to define between them an annular channel 22 for passing a bypass stream (or cold stream).

The engine also has a plurality of outlet guide vanes (OGVs) 24, each extending radially from the inside wall 20 of the outer cover 16 through the bypass stream flow channel 22 to the outside wall 14b of the inner cover.

These OGVs 24 are positioned in the bypass stream flow channel 22 downstream from fan blades 26 and they serve typically to straighten out the bypass stream along the axis X-X of the engine.

In order to reduce jet noise, in particular during takeoff stages, the invention makes provision for taking off air flowing in the bypass stream flow channel 22 in order to inject it further downstream in the form of microjets at the trailing edge of the outer cover 16 so as to act on the shear layers between the bypass stream and the air outside the engine flowing along the outer cover, thereby enhancing mixing between these air streams.

More precisely, for the target microjet activation conditions during takeoff stages, the inventors consider that advantageously the speed of ejection of air by means of microjets should be at least 200 meters per second (m/s), the air discharge rate through the microjets should be at least 2.3 kilograms per second (kg/s), and the ratio of the ejection surface area of all of the microjets over the total ejection surface area of the bypass stream flow channel should lie in the range 0.5% to 2.5%.

For this purpose, and as shown more precisely in FIGS. 2 to 4, the invention makes provision for fitting a plurality of microjet circuits 28 to the outer cover 16 of the engine, e.g. eight to 16 such circuits, which circuits may be regularly spaced apart from one another around the longitudinal axis X-X.

Each microjet circuit 28 includes in particular at least one intake scoop 30 that opens out into the bypass stream flow channel 22 downstream from the OGVs 24. The intake scoops shown in the figures are said to be "dynamic", i.e. they project into the bypass stream flow channel. Alternatively, the intake scoops could be level with the inside wall 20 of the outer cover.

The intake scoop 30 of each microjet circuit 28 (or at least one scoop when there are several) is positioned directly downstream from the OGVs 24, and preferably in a zone P of the outer cover 16 that extends axially from upstream to downstream from the trailing edges 24a of the OGVs 24 up to a limit L lying in the range ⅓ to ⅔ of the axial distance between the trailing edges of the OGVs and the trailing edge of the outer cover.

Each microjet circuit 28 also has a single feed duct 32 to which the corresponding intake scoop 30 leads, and that opens out at a downstream end at a trailing edge of the outer cover 16.

In the embodiment of FIGS. 1 to 4, the feed duct 32 of each microjet circuit is a tube that is positioned inside the outer cover 16 between its inside wall 20 and its outside wall.

The feed duct 32 is connected upstream to the intake scoop(s) 30 and downstream to at least one ejection grating 34, each ejection grating being suitable for splitting the intake gas stream into a plurality of gas streams having cross-sections of dimensions that are less than a right section of the feed duct.

Preferably, the intake scoop 30 and the downstream end of the feed duct 32 that is connected to the ejection grating 34 are in axial alignment with each other so as to minimize head losses.

Furthermore, it is preferable to select an intake scoop 30 of inlet section $S_{IN}$ (FIG. 4) lying in the range 0.002 m² to 0.005 m², and a feed tube 32 of outlet section $S_{OUT}$ lying in the range 0.001 m² to 0.003 m². The variations in section between the inlet and outlet sections $S_{IN}$ and $S_{OUT}$ are advantageously progressive in order to minimize head losses.

In a variant embodiment shown in FIG. 5, each microjet circuit 28' has two intake scoops 30 leading to a single feed duct 32 with the downstream end of the feed duct having its axis offset relative to each of the intake scoops.

This variant embodiment is particularly advantageous if a large flow rate is required for the microjet circuit 18'. Specifically, with this solution having pairs of intake scoops, it is possible to feed the feed duct 32 using intake scoops that are of small inlet section.

In another variant embodiment, shown in FIG. 6, each microjet circuit 28" has a single intake scoop 30 opening out into a single feed duct 32, which in turn opens out via two ejection gratings 34 that have their axes offset relative to the intake scoop.

This variant embodiment presents the advantage of minimizing the total number of intake scoops, and thus the weight of the device of the invention.

In an advantageous provision (not shown in the figures) that is applicable to all three above-described embodiments, the jet noise reduction device may further include means for deploying (i.e. opening) and retracting (i.e. closing) the intake scoops of the microjet circuits. For example, these means may be constituted by a retractable device suitable for retracting the scoop serving firstly to eliminate the obstacle that it might constitute in the flow passage, and secondly obstructing the inlets of the intake scoops. Such a retractable device is moved into its open and closed positions by an actuator system, such as a jack.

With such a provision, it is possible to deploy and open the intake scoops during takeoff stages in which the microjets need to be activated in order to reduce jet noise, and to retract and close the scoops during other stages of flight so as to avoid penalties on the performance of the engine.

In another advantageous provision (not shown in the figures), that is applicable to all three above-described embodiments, the jet noise reduction device may also include means for regulating the flow rate of the gas stream flowing in the feed ducts of the microjet circuits. For example, such means may be constituted by a valve positioned inside the feed duct and controlled by an electronic computer of the airplane as a function of stages of flight.

Figure 7B:
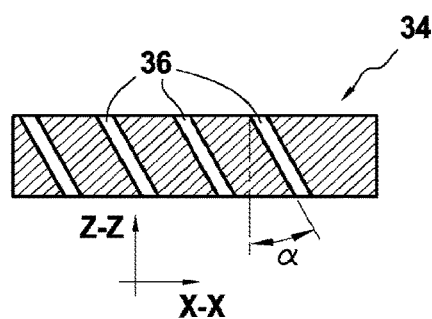
Figure 7C:
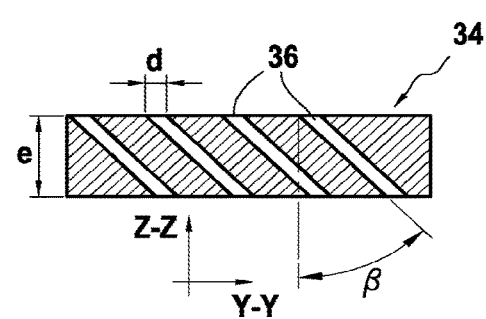

FIGS. 7A to 7C show in greater detail an embodiment of an ejection grating 34 fitted to each of the microjet circuits.

The ejection grating 34 is in the form of a plate that is perforated by a plurality of holes 36, each having a right section of dimension that is less than the right section of the feed duct 32. More precisely, these holes 36 are open upstream into the feed duct 32 of the corresponding microjet circuit and they open out downstream at the trailing edge of the outer cover 16 in a zone of confluence between the gas stream coming from the bypass stream flow channel 22 and the stream of air outside the engine flowing around the outer cover.

Furthermore, the holes 36 open out into this zone of confluence with a penetration angle α (relative to the radial axis Z-Z of the outer cover—FIG. 4B) and/or a sideslip angle β (relative to the radial axis Z-Z—FIG. 4C). The penetration angle α is defined in a longitudinal plane relative to the longitudinal axis X-X of the outer cover (corresponding to the flow axis of the bypass stream passing through the engine), i.e. a plane formed by the longitudinal and radial axes X-X and Z-Z of the outer cover, while the sideslip angle β is defined in a plane that is transverse relative to the longitudinal axis X-X of the outer cover, i.e. a plane formed by the tangential and radial axes Y-Y and Z-Z of the outer cover.

Preferably, the penetration angle α lies in the range 10° to 60°, and the sideslip angle β lies in the range 25° to 90°. Penetration and sideslip angles α and β selected in these ranges of values make it possible to obtain large improvements in terms of jet noise reduction.

Furthermore, as shown in the embodiment of FIGS. 7A to 7C, the holes 36 may be cylindrical in shape with a right section that is circular in shape.

Under such circumstances, the right section of the holes 36 advantageously presents a diameter $\underline{d}$ lying in the range 0.5 mm to 2.5 mm, to be compared with the (circular or other) section of the feed duct 32 which lies in the range 0.001 $m^2$ to 0.004 $m^2$.

It should be observed that when the holes 36 are cylindrical in shape, the plate forming the ejection grating may present a thickness $\underline{e}$ that is at least twice as great as the diameter $\underline{d}$ of the holes. This thickness $\underline{e}$ may naturally vary over the entire length of the plate so as to facilitate integrating it in the ejection grating.

FIG. 8 shows a variant embodiment of the ejection grating 34' for each microjet circuit. In this variant, the holes 36' are in the shape of parallelepipeds with a right section that is rectangular in shape.

In a variant, the right section of the holes 36' (i.e. their area) is of a dimension that is less than the right section of the feed duct, and these holes advantageously present a penetration angle relative to the longitudinal axis of the outer cover and/or a sideslip angle relative to the tangential axis of the outer cover.

Naturally, the shape of the holes formed in the plate forming the ejection grating could be other than those shown herein. It is thus possible to select holes that present a right section that is rectangular while interchanging length and width compared with FIG. 8 or holes of right section that is of elliptical or other shape.

FIG. 9 shows the acoustic improvements (gain in decibels) as a function of frequency (in Hz) obtained using the jet noise reduction device of the invention.

Curve $C_1$ in this figure corresponds to the curve for the acoustic improvement obtained with a jet noise reduction device not having ejection gratings of the invention (i.e. the feed ducts open out directly in the trailing edge of the outer cover).

Curve $C_2$ shows the acoustic improvements obtained with a jet noise reduction device in accordance with the invention (i.e. with ejection gratings positioned at the downstream end of the feed duct of each microjet circuit).

These curves show a substantial acoustic improvement δ obtained by a device of the invention (curve $C_2$) compared with a device that does not have ejection gratings (curve $C_1$), in particular at medium and high frequencies (represented respectively by value ranges B and C, where range A represents low frequencies). This acoustic improvement is due in particular to the presence of the ejection grating, which does indeed make its own noise, but that noise is less than the noise made by a feed duct opening out directly at the trailing edge of the outer cover.

The invention claimed is:

1. A device for reducing; et noise from a turbine engine, the device comprising:
    an outer cover provided on an inside with a wall configured to form an outer wall of an annular passage for passing a flow of a bypass stream coming from the engine, wherein the wall of the outer cover includes a plurality of microjet circuits, each having intake means configured for taking a stream of gas from the bypass stream flow passage and leading to a single feed duct, said feed duct opening out at a trailing edge of the outer cover, at least one ejection grating suitable for splitting the intake gas stream into a plurality of gas streams of right sections that are of dimensions smaller than a right section of the feed duct.

2. The device according to claim 1, wherein the ejection grating of each microjet circuit comprises a plate having a plurality of holes, each having a right section that is of a dimension less than the right section of the feed duct.

3. The device according to claim 2, wherein at least some of the holes in the plate of each ejection grating present, in a longitudinal plane relative to a flow axis of the bypass stream, a penetration angle relative to a radial axis lying in the range 10° to 60°, and/or, in a transverse plane relative to the flow axis of the bypass stream, a sideslip angle relative to said radial axis lying in the range 25° to 90°.

4. The device according to claim 2, wherein the holes in the plate of each ejection grating present a right section that is circular in shape.

5. The device according to claim 4, wherein the right section of the holes in the plate of each ejection grating presents a diameter lying in the range 0.5 mm to 2.5 mm.

6. The device according to claim 2, wherein the holes in the plate of each ejection grating present a right section that is of rectangular or elliptical shape.

7. The device according to claim 1, wherein the ejection grating of each microjet circuit is in axial alignment with the gas stream intake means.

8. The device according to claim 1, wherein the gas stream intake means in each microjet circuit comprise one or two intake scoops configured to open out into the bypass stream flow passage and leading to the feed duct.

9. The device according to claim 1, further comprising outlet guide vanes extending radially from the inside wall of the outer cover through the bypass stream flow passage, each microjet circuit having at least one intake scoop configured to open out into the bypass stream flow passage downstream from the outlet guide vanes and leading to the feed duct.

10. The device according to claim 9, wherein said at least one intake scoop of each microjet circuit is configured to open out into the bypass stream flow passage in a zone of the outer cover configured to extend axially from upstream to downstream from the trailing edges of the outlet guide vanes to a limit lying in the range ⅓ to ⅔ of the axial distance between the trailing edges of the outlet guide vanes and the trailing edge of the outer cover.

11. The device according to claim 9, wherein each microjet circuit has a single intake scoop leading into the feed duct, the intake scoop and the downstream end of the feed duct being axially in alignment with each other.

12. The device according to claim 9, wherein each microjet circuit has two intake scoops leading into the feed duct, the downstream end of the feed duct having its axis offset relative to each of the intake scoops.

13. The device according to claim 9, wherein each microjet circuit has a single intake scoop leading into the feed duct which opens out at the trailing edge of the outer cover via two ejection gratings having their axes offset relative to the intake scoop.

14. The device according to claim 9, wherein the microjet circuits are regularly spaced apart from one another around a longitudinal axis of the outer cover.

15. The device according to claim 9, further comprising means for deploying and retracting the intake scoops of the microjet circuits.

16. The device according to claim 9, further comprising means for regulating the flow rate of the gas stream flowing in the feed ducts of the microjet circuits.

17. The device according to claim 1, presenting progressive variations in section between the inlet sections and the outlet sections of each microjet circuit in order to minimize head losses.

18. The device according to claim 17, wherein the relationship governing said progressive variation in section presents at all points a derivative of absolute value that is less than 0.1.

19. The device according to claim 1, wherein the number of microjet circuits of the device is greater than a value corresponding to six times the diameter expressed in meters of the circular section of the secondary nozzle at its ejection.

20. A turbine engine comprising:
a central body, an inner cover arranged coaxially around the central body in order to co-operate therewith so as to define an annular passage for passing a core stream coining from the engine, and an outer cover arranged coaxially around the inner cover to co-operate therewith to define an annular passage for passing a bypass stream coming from the engine, the engine further including a jet noise reduction device, the device comprising an outer cover provided on the inside with a wall configured to form an outer wall of an annular passage for passing a flow of a bypass stream coining from the engine, wherein the wall of the outer cover includes a plurality of microjet circuits, each having intake means configured for taking a stream of gas from the bypass stream flow passage and leading to a single feed duct, said feed duct opening out at a trailing edge of the outer cover via at least one ejection grating suitable for splitting the intake gas stream into a plurality of gas streams of right sections that are of dimensions smaller than a right section of the feed duct, the outer cover of the engine being formed by the outer cover of said jet noise reduction device.

21. The turbine engine according to claim 20, wherein the ejection area of the ejection grating lies in the range 0.5% to 2.5% of the ejection area of the bypass stream flow passage.

* * * * *